United States Patent Office 3,711,552
Patented Jan. 16, 1973

3,711,552
PROCESS FOR THE MANUFACTURE OF N,N-BIS-
(2-CHLOROETHYL)-2-NITRO-4-ALKYLANILINE
Harold M. Foster, Park Forest, Thomas C. Rees, Park Forest South, and Floyd G. Spencer, Park Forest, Ill., assignors to The Sherwin-Williams Company, Cleveland, Ohio
No Drawing. Filed Mar. 16, 1970, Ser. No. 20,108
Int. Cl. C07c 87/52
U.S. Cl. 260—577                                            2 Claims

ABSTRACT OF THE DISCLOSURE

A process for the direct ortho-mononitration of N,N-dihaloalkyl-4-substituted tertiary aromatic amines in the presence of less than fivefold molar excess over theoretical of nitric acid and optionally a catalytic amount of nitrous acid, or a derivative thereof capable of generating nitrite ions in aqueous acid, optionally in the presence of a hydrophobic, essentially immiscible organic phase, without the formation of 2,6-dinitro-4-substituted product or unwanted by-products. Specifically, a process for the manufacture of N,N-bis(2-chloroethyl)-2-nitro-p-toluidine by the nitration of N,N-bis(2-chloroethyl)-p-toluidine. The N,N-bis(2-chloroethyl)-2-nitro-p-toluidine is a repellent for Mexican bean beetles and beetle larvae.

BACKGROUND OF THE INVENTION

Practically all known nitrating agents such as concentrated nitric acid, mixed acids, for example nitric acid admixed with a dehydrating acid such as oleum, sulfuric acid, acetic anhydride, acetic acid, phosphorus pentoxide, alkylene nitrates in the presence of sulfuric acid, organic nitrates such as acetyl and benzyl nitrates, metal nitrates with acetic acid, nitrosulfonic acid, nitrogen tetroxide and the like, have been used in the preparation of nitroaromatic compounds. Economic considerations are generally determinants in the choice of the agent. Often, however, certain inherent chemical or physical properties, or the presence of substituents, necessitate the use of specific nitrating agents. The choice of the nitrating agent and the conditions of reaction may furthermore determine the position of the entering nitro group. As a rule, the orientation of entering nitro groups in aromatic compounds is determined by the position of groups already present. Generally, the nitro group enters a position meta to a nitro, sulfonic acid, carboxyl, or carbonyl group; and ortho and para to a chloro, bromo, alkyl, amino, or hydroxyl group. Further, a lower temperature of nitration is conducive to the exclusive formation of the meta derivatives in the first group, and a preponderance of para compound in the second. In case two or more groups are already present, it is difficult to predict which compound will be formed owing to the conflicting influences of these groups, and often a mixture of different compounds will result upon nitration. ("Unit Processes in Organic Synthesis," by P. H. Groggins, page 8, McGraw-Hill Book Co., Inc., New York, 1938.) Since amino compounds are very susceptible to oxidation, it is generally necessary to protect the $NH_2$ group during nitration, usually by converting the amine to its acyl derivative. Sometimes it is possible to nitrate amino compounds without resorting to previous acylation but the product obtained is likely to differ from that obtained by the nitration of the acyl derivative. For example, when p-toluidine is dissolved in a large quantity of sulfuric acid and nitrated with mixed acid ($HNO_3$—$H_2SO_4$ mixture) at low temperatures, 3-nitro-p-toluidine is obtained. The nitration of the acetyl derivative yields 2-nitro-p-toluidine. (Groggins, page 10, current numbering.)

Surprisingly, it was found that N,N-di(2-haloalkyl) amino-p-phenyl substituted compounds which are tertiary aromatic amines, can be directly nitrated, nearly quantitatively, to the mononitro product in the presence of a catalytic amount of nitrous acid or a derivative thereof capable of generating nitrite ions in aqueous acid. Better results are achieved if the reaction is carried out in the presence of a second liquid phase comprising an organic liquid nonmiscible with the aqueous phase when less than a five-fold molar excess over theoretically required nitric acid is employed. This is particularly unexpected since the presence of nitrous acid in the formation of the ortho-mono-nitrated-4-substituted amine in acetic acid solution produces an uncontrollable reaction at temperatures in excess of 25° C. which yields an undesirable mass of compounds partially identifiable as nitrosated-4-substituted amines and ortho-dinitrated-4-substituted amines. Such an organic liquid is preferably a hydrophobic solvent in which the N,N-dihaloalkyl starting material is relatively less soluble than in the aqueous phase but in which the mononitro N,N-dihaloalkyl product is relatively more soluble. When the instant reaction is carried out in a multiphase system of aqueous and organic solvents to which are attributable the hereinbefore mentioned solubility characteristics, the mononitro product is incorporated into the organic phase substantially as quickly as it is formed, thus decreasing the concentration of product molecules in the immediate vicinity of the reactants and permitting surprisingly high yields with correspondingly fast reaction rates.

The ortho-mononitrated tertiary aromatic amines manufactured by the instant process are highly effective miticides, insecticides and nematocides. In particular, N,N-bis(2-chloroethyl)-2-mononitro-p-toluidine is highly effective in repelling Mexican bean beetle larvae, as well as being a valuable intermediate for the preparation of the ortho-dinitrated compound, namely N,N-bis(2-chloroethyl)-2,6-dinitro-p-toluidine, an extremely effective and highly selective herbicide, the process for which is the subject matter of co-pending application Ser. No. 20,124, filed Mar. 16, 1970. The instant ortho-mononitrated compound may be used as a beetle repellent in liquid solutions or incorporated with finely divided solids such as talc, pumice, clay and the like. If desired it may be compounded with either solid or liquid fertilizer mixtures. When used as a miticide, preferred concentrations are in the range from about 0.05 to about .5 percent by weight of solution and when used as a beetle repellent it is preferably used in the concentration range from about 1 to about 20 lbs. per acre.

The nitration of organic compounds is one of the most important unit processes and plays an important part in the manufacture of explosives, the dyestuff industry, pharmaceuticals, and biologically toxic compounds. Water is a product of the reaction of the nitration processes, and unless this water is removed, the reaction approaches an equilibrium before completion. Many attempts have been made to remove this water by chemical combination and thus to prevent an equilibrium being produced, so that the reaction will be continued. The most successful of such attempts, and the one commonly in use, is to provide concentrated sulfuric acid in the zone of the reaction to absorb the water produced. The sulfuric acid is mixed with nitric acid in certain definite proportions, depending upon the particular materials used and this mixture of nitric and sulfuric acids is referred to in the art as "mixed nitrating acid." For mononitration the proportion of nitric in the mixed acid generally does not exceed 33%. For higher nitration the proportion of nitric acid becomes smaller and smaller and may be as low as 3 to 5% with consequent increases in the amount of sulfuric acid. The increased proportion of sulfuric acid is necessary to combine with the larger amount of water involved during these particular reactions. Thus, the mixed acid requires a certain distribution of the two acids depending upon the particular nitration reaction involved before it can be used for that reaction.

The instant reaction is a nitration reaction which utilizes nitric acid and no sulfuric acid. In particular, it makes no effort to absorb or otherwse tie up the water formed during the reaction. Yet it is an extremely successful reaction.

The nitration step of the instant process contemplates a reaction which in its preferred form may be generally represented as follows:

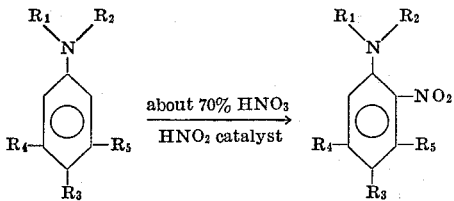

wherein $R_1$ and $R_2$ are independently selected from the group consisting of 2-haloalkyl having from 2 to 4 carbon atoms; $R_3$ is selected from alkyl having from 1 to 4 carbon atoms, aryl, aralkyl, alkoxy, halogen and haloalkyl having from 1 to 4 carbon atoms; $R_4$ and $R_5$ are independently selected from the group consisting of hydrogen, alkyl having from 1 to 4 carbon atoms, haloalkyl having from 1 to 4 carbon atoms, and halogen.

More particularly, it has been discovered that N,N-(2-chloroethyl)-p-toluidine can be effectively ortho-mononitrated in aqueous acid medium intimately mixed with a liquid organic solvent, in the presence of a catalytic quantity of nitrous acid or derivative thereof, thought to be according to the following reaction:

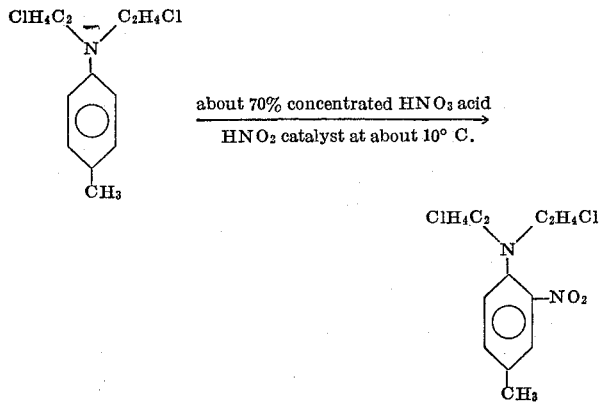

The nitration reaction embodied in the instant process is again unexpected in light of the authoritative discussion and study of the kinetics and mechanism of aromatic nitration set forth in Part VII "Products of Nitration of Aniline Derivatives, Especially of Dimethylaniline. The Concomitant Dealkylation of the Dialkylanilines," by Glazer, Hughes et al. in J. Chem. Soc., 1950 pages 2657–2678, wherein the authors discuss in detail various derivatives obtained upon nitration and conclude that "the nuclear nitration of derivatives of aniline by means of nitric acid takes place by two mechanisms, one which can proceed in the absence of nitrous acid, whilst the other is dependent upon nitrous acid; that these two mechanisms often operate simultaneously; and that side reactions may occur, some of which are oxidative, producing nitrous acid which influences both nitration mechanisms, especially the second; and that with tertiary alkylated anilines, dealkylation is a frequent concomitant of nitration." One skilled in the art would have no reason to believe that a substituted dihaloalkyl derivative would behave more stably than the methyl derivatives of aniline, particularly dimethylaniline. In other words, many competing reactions could be expected to occur which, for some reason not clearly known at this time, do not.

U.S. Pat. 2,739,174 entitled "Nitrating Aromatic Hydrocarbons With Only Nitric Acid" teaches that "When nitric acid is reacted with a nitratable compound, the products of reaction are the nitro compound and water. Unless water is removed from the zone of reaction, the nitration soon stops." (column 1, lines 27–31.) In the instant invention the water is not removed from the zone of reaction, yet the nitration does not stop. The mononitration reaction goes to completion, but it does not progress further to form the ortho-dinitro compound, provided excess nitric acid is limited to less than a fivefold molar excess over theoretical.

It is a peculiarity of the instant reaction that at temperatures lower than 25° C. no mononitration occurs provided no nitrous acid or derivatives thereof capable of generating nitrite ions in aqueous acid is present. If the temperature is increased and particularly when the temperature is about 60° C., the mononitrated compound begins to form slowly at first and then form more rapidly even in the absence of nitrous acid. In the presence of enough nitrous acid, mononitration proceeds smoothly at about 10° C., or below, without appreciable acceleration, so that formation of the mononitrated compound is well controlled. Whether or not nitrous acid is present, it is desirable to monitor the consumption of the reactant dihaloalkyl compound, and to quench the reaction prior to the complete consumption of the precursor dihaloalkyl compound.

Of particular interest is the fact that the N,N-bis(2-hydroxy ethyl)-p-toluidine cannot be directly mononitrated under similar reaction conditions. It is necessary that the dihydroxy alkyl-substituted paratoluidine be first halogenated prior to ortho-mononitration.

The literature ("Nitrous Acid as a Nitrating Agent, Part I, Nitration of Dimethyl-p-toluidine," J. Chem. Soc., 1930, pp. 277–291) states that the mononitro product of dimethyl-p-toluidine in which the nitro group enters the nucleus of the molecule normally produced by the nitration process is the 3-nitro-dimethyl-p-toluidine(meta-product). It will be noted that in the instant invention the ortho-nitro product is formed. In other words, assuming that the dihaloalkyl side chains of the instant starting material would be no more susceptible to attack, nor have a substantially different effect on the course of the reaction than the dimethyl groups, then "ordinary" nitration would be expected to yield the meta-mononitro-substituted product, rather than the ortho-mononitro-substituted p-toluidine. Viewed conventionally, the instant process embodies an "ordinary" nitration except for the fact that essentially only nitric acid optionally with a catalytic quantity of nitrous acid is used to speed up the reaction without sacrificing either control or yields.

The reaction embodied in the instant invention is again unexpected in light of the authoritative discussion and study of the kinetics and the mechanism of aromatic nitration set forth in Part VII "Products of Nitration of Aniline Derivatives, Especially of Dimethyl Aniline. The Concomitant Dealkylation of the Dialkylanilines" by Glazer, Hughes et al., supra, wherein the authors discuss in detail various derivatives obtained upon nitration and the probable mechanisms by which they occur. When dimethyl aniline was nitrated, it gave the metanitro derivative, presumably through its conjugate acid with nitronium ion as the reagent. Immediately thereafter it is stated, "These nitration stages are highly dependent on nitrous acid when the availability of the nitronium ion is low, but are notably less so when it is high." However, it will be noted that the nitration was carried in the presence of concentrated sulfuric acid. No concentrated sulfuric acid is present in the instant reaction. Immediately thereafter, the nitration of dimethyl aniline by nitric acid in various concentrations in ether is discussed. It was found that part of the material became oxidized to give tetramethylbenzidine and other products, along with nitrous acid. The first sample substitution product was nitroso diethyl aniline which was formed after an induction period. With a more concentrated nitration solution, or at a higher temperature, this substance became oxidized to p-nitro-dimethyl aniline, and then into substances involving demethylation. Also listed is the nitration of dimethyl aniline by nitric acid in acetic acid as solvent which gave the p-nitro dimethyl aniline as the main product. When a more concentrated nitration solution was used in acetic acid, the main product was found to be 2,4-dinitro dimethyl aniline. When dimethyl aniline was treated in 10% solution in acetic acid for 24 hours at room temperature with varying quantities of 70% nitric acid containing nitrous acid, the proportion of nitric acid ranging from 1 to 1/5 mols per mol of dimethyl aniline, near the lower end of the range, much dimethyl aniline remains unconverted under the conditions used; but by careful chromatography small amounts of p-nitroso dimethyl aniline and the dinitrotetramethyl benzidine were isolated. In the following paragraph the authors state, "It is usually rather easy to separate the stages of successive nitration of a benzene derivative; but it seems very difficult to effect a clean separation of the mononitration from the dinitration of dimethyl aniline. As the proportion of nitric acid was gradually increased in these experiments, unconverted dimethyl aniline, and green nitroso compounds disappeared in succession from the products; and, simultaneously, mononitrodimethyl anilines and 2,4-dinitro dimethyl aniline successively appeared in the products. With 1.4 mols of nitric acid per mol of dimethyl aniline, no unconverted dimethyl aniline remained, and only small amounts of nitroso compounds were present, whilst the formation of 2,4-dinitro dimethyl aniline did not assume large proportions. These were judged to be the best conditions for mononitration." From a study of what was judged to be the best conditions for mononitration, it will be apparent that they were unable to arrive at results approximating those in the instant invention.

SUMMARY OF THE INVENTION

It has been discovered that an N,N-dihaloalkyl-substituted tertiary aromatic amine can be directly ortho-mononitrated without appreciable further conversion to the dinitrated form, provided that less than a fivefold molar excess over theoretical of nitric acid, in the range from about 30% to about 90%, is used. Substantially quantitative yields are obtained if the reaction is carried out in mixed organic and aqueous phases. The reaction is accelerated in the presence of nitrous acid or a derivative thereof capable of generating nitrite ions in aqueous acid, without any sacrifice in yields provided that the concentration of nitric acid and the quantity used is such that the acid near the completion of the reaction analyzes 30% aqueous acid. High selectivities greater than 90% and excellent yields are achieved. In general, the temperature at which reaction occurs is in the range of 10° C. to 100° C.

DESCRIPTION OF PREFERRED EMBODIMENT OF THE INVENTION

A preferred and specific embodiment of the instant process is the ortho-mononitration of N,N-bis(2-chloroethyl)-p-toluidine with about 70% concentrated nitric acid in conjunction with nitrous acid catalyst in the presence of a haloaliphatic or mononuclear aromatic solvent. The reaction is carried with intimate mixing in a jacketed pressure vessel equipped with internal heat exchange means and variable adjustable mixing means. Though the reaction may be carried out continuously, batch-wise reaction in an autoclave gives exceedingly good results with a high degree of control and reproducibility.

At least a 50% excess over the theoretically required amount of nitric acid, and preferably about a twofold excess of about 70% aqueous nitric acid is used. Lower concentrations of acid will require proportionately larger excesses, but at least enough acid must be used to ensure that the concentration near completion of the reaction is at least 30% acid. Solid sodium nitrite is added to the acid mixture to generate nitrous acid. The amount of nitrous acid generated may be in the range from about 0.001 to 10% by weight of the reaction mixture, though about 0.1 to 1% is most preferred. Use of the catalyst gives high yields but with controllable speeds and the presence of the organic phase permits high selectivity to the mono-nitrated compound.

The ratio of the aqueous phase to the hydrophobic organic phase is not critical if there is sufficient liquid in each phase to permit adequate interfacial contact area for transfer of the nitrated product from the reaction zone into the organic solvent phase, and enough organic solvent to dissolve the nitrated product.

A wide variety of organic liquids have properties suitable for use as the hydrophobic organic phase. In general, these liquids should be nonviscous, relatively inert to the reactants and reaction products under the reaction conditions, substantially immiscible with the aqueous phase, and have relatively high solubility for the nitrated product. Relatively low solubility for the dihaloalkyl-substituted tertiary aromatic amine precursor is also desirable. These requirements are met by numerous organic compounds including halogenated aliphatic hydrocarbons having from 1 to 9 carbon atoms, preferably chloroform and carbon tetrachloride, and mononuclear aromatic hydrocarbons including benzene, xylenes, toluene, and nitro- and halo-derivatives thereof.

The instant process comprises reacting a dihaloalkyl-4-substituted tertiary aromatic amine with less than a fivefold molar excess of nitric acid present at the beginning of the reaction in the concentration range from about 30 to 90% nitric acid in sufficient quantity to leave at least a 30% aqueous acid near the completion of the reaction, and intimately mixed with a hydrophobic organic solvent, in the presence of a catalytic quantity of nitrous acid, or a derivative thereof capable of generating nitrite ions in aqueous acid, to produce predominantly a partially water-soluble, organic solvent-partitionable ortho - mononitro-dihaloalkyl-4-substituted tertiary aromatic amine.

The partitioning of a compound between two solvent phases is conveniently expressed as a distribution ratio or partition coefficient which, for the purposes of this disclosure, may be defined as:

$$\frac{\text{Percent soluble in the aqueous phase}}{\text{Percent soluble in the organic phase}} = K$$

wherein $K$ is the distribution or partition coefficient. The partition coefficient for the precursor dihaloalkyl 4-substituted amine may be defined more accurately as:

$$\frac{\text{Percent halogen}[1] \text{ dissolved in the aqueous phase}}{\text{Percent halogen dissolved in the organic phase}} = K_{Hal}$$

Similarly the partition coefficient for the product dihaloalkyl-ortho-mononitro-4-substituted amine may be defined more accurately as:

$$\frac{\text{Percent NO}_2{}[1] \text{ dissolved in the aqueous phase}}{\text{Percent NO}_2 \text{ dissolved in the organic phase}} = K_{NO_2}$$

and the partition coefficient for an alkyl-substituted tertiary aromatic amine may be defined more accurately as:

$$\frac{\text{Percent alkyl}[1] \text{ dissolved in the aqueous phase}}{\text{Percent alkyl dissolved in the organic phase}} = K_{Alk}$$

The precursor dihaloalkyl-4-substituted amines have partition coefficient $K_{Hal}$ in the range from about 10 to

---

[1] Unless otherwise indicated, all "percent" notations are percent by weight of the solvent in which the compound is dissolvable.

about 1000, indicating they are much more soluble in the aqueous phase than they are in the organic phase. The product ortho-mononitrated-4-substituted amines, on the other hand, are much more soluble in the organic phase than they are in the aqueous phase, and have partition coefficients $K_{NO_2}$ in the range from about 0.001 to about 0.1.

To the acid and organic solvent mixture, which contains nitrous acid catalyst, is added N,N-bis(2-chloroethyl)-p-toluidine and it is homogeneously dispersed into the acid phase. The mixture is maintained at about 10° C. when the mononitro-ortho-substituted compound begins to form smoothly and controllably. It is desirable that the reaction mass be sampled to determine the rate of progress of the reaction. If the reaction embodied in the instant process is stopped prior to the complete consumption of the N,N-dihaloalkyl tertiary aromatic amine, it is found that the ortho-mononitrated compound can be recovered almost quantitatively.

The organic solvent phase is thereafter separated from the aqueous phase. This is conveniently accomplished by allowing the quiescent fluid mixture to stratify, then separating the organic solvent containing the desired product. The multiphase reaction mixture may be separated by centrifuging, distillation, liquid extraction, or other known means. The product may be recovered from the organic solvent phase by evaporation of the organic phase. It may be convenient to neutralize the organic solvent phase with an aqueous solution of an alkaline, water-soluble salt followed by separation of the aqueous and organic phases. Again, the entire reaction mixture may be neutralized prior to separation of the phases if only a slight excess of concentrated nitric acid is used; it will be apparent that the economics of neutralizing large excesses of reusable nitric acid would not be inviting. Small quantities of concentrated sulfuric acid are tolerated by the instant nitration reaction, but any significant quantity of sulfuric acid, that is, any amount capable of absorbing an appreciable portion of the water formed during reaction, is detrimental. Similarly, small quantities of glacial acetic acid or acetic anhydride are also tolerable but undesirable.

In the following examples all parts are parts by weight unless otherwise stated. All references to percent concentrated nitric acid, or other acids, define the weight concentration of acid in aqueous solution, for example 70% concentrated acid implies 30% by weight water is present.

EXAMPLE 1

80 g. N,N-bis(2-chloroethyl)-p-toluidine dispersed in 400 ml. chloroform is stirred at about 10° C. while 86.4 ml. 70% nitric acid containing 0.8 g. $NaNO_2$ is added slowly thereto. Stirring is continued until analysis indicates that only a trace of the precursor dihaloalkyl persists, at which time the reaction mass is neutralized with sodium carbonate solution (64 g. $Na_2CO_3$ in 150 ml. water). After stratification, organic and aqueous layers are separated. The chloroform is dried, either over $MgSO_4$, or by azeotropic distillation and stripped of solvent chloroform to leave about 97 g. of a dark red, oily liquid. Analysis by thin layer chromatography and by gas chromatography indicated the compound was nearly pure N,N-bis(2-chloroethyl)-2-nitro-p-toluidine. The structure was confirmed by converting it, by further nitration with more than a fivefold excess of concentrated nitric acid, to the ortho-dinitro compound.

A similar ortho-mononitration reaction can be carried out with a precursor material in which the methyl group of p-toluidine is replaced by a phenyl group. Again, a similar reaction can be carried out with a precursor material in which the haloalkyl substituents are 2-chloropropyl. In each case, the ortho-mononitrated product will be formed.

EXAMPLE 2

The preceding Example 1 was duplicated, in the absence of nitrous acid generated by addition of a salt thereof to aqueous acid, but at the low temperature (10° C.) of the reaction, no appreciable mononitration occurred. However, when the temperature was increased to about 25° C., mononitration proceeded slowly. As the temperature was increased, mononitration accelerated. The reaction was quenched by neutralization as before, and the ortho-mononitrated product recovered from the chloroform solvent as before.

Although preferred embodiments of this invention are illustrated, it is to be understood that various modifications and rearrangements may be resorted to without departing from the scope of the invention disclosed and claimed.

What is claimed is:

1. A process for preparing N,N-bis(2-chloroethyl)-2-nitro-4-alkyl aniline from N,N-bis(2-chloroethyl)-4-alkyl-aniline wherein the alkyl group is selected from the group consisting of methyl, ethyl, propyl, and butyl, consisting essentially of the steps of:
   (a) contacting with agitation said N,N-bis(2-chloroethyl)-4-alkyl aniline with a molar excess of from 50% to 500% over the theoretically required amount of concentrated aqueous nitric acid, the concentration of such acid being from 30% to 90% at the beginning of the reaction and at least 30% aqueous nitric acid near the completion of the reaction and in the presence of from 0.001% to 10% by weight of the reaction mixture of a nitrate ion precursor selected from the group consisting of nitrous acid and sodium nitrite in an aqueous phase and in the presence of a hydrophobic organic phase selected from the group consisting of chloroform, carbon tetrachloride, benzene, xylene, and toluene, at a temperature of from 10° to 100° C. for a period of time sufficient to form N,N-bis(2-chloroethyl)-2-nitro-4-alkyl aniline;
   (b) stopping the reaction prior to complete consumption of the N,N-bis(2-chloroethyl)-4-alkyl aniline;
   (c) separating the aqueous phase from the organic phase; and
   (d) recovering N,N-bis(2-chloroethyl)-2-mononitro-4-alkyl aniline from the organic phase.

2. A process in accordance with claim 1 wherein the nitrous acid is derived from sodium nitrite in the aqueous phase.

References Cited

UNITED STATES PATENTS

| | | | |
|---|---|---|---|
| 2,435,314 | 2/1948 | Kokatnur | 260—688 X |
| 2,739,174 | 3/1956 | Ross | 260—688 X |

OTHER REFERENCES

Groggins: Unit Processes in Organic Synthesis, McGraw-Hill Book Co., Inc., New York, 1958, pp. 61, 70–72.

LEWIS GOTTS, Primary Examiner

C. F. WARREN, Assistant Examiner

U.S. Cl. X.R.

260—571, 573, 574, 575, 576, 578, 688